US010379601B2

United States Patent
Armstrong

(10) Patent No.: US 10,379,601 B2
(45) Date of Patent: Aug. 13, 2019

(54) PLAYING SPHERICAL VIDEO ON A LIMITED BANDWIDTH CONNECTION

(71) Applicant: GOOGLE INC., Mountain View, CA (US)

(72) Inventor: Charles Robert Armstrong, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 206 days.

(21) Appl. No.: 15/261,225

(22) Filed: Sep. 9, 2016

(65) Prior Publication Data

US 2017/0075416 A1 Mar. 16, 2017

Related U.S. Application Data

(60) Provisional application No. 62/216,585, filed on Sep. 10, 2015.

(51) Int. Cl.

| | |
|---|---|
| ***G06F 3/01*** | (2006.01) |
| ***H04L 29/06*** | (2006.01) |
| ***G06F 3/14*** | (2006.01) |
| ***H04N 21/218*** | (2011.01) |
| ***H04N 21/2343*** | (2011.01) |
| ***H04N 21/414*** | (2011.01) |
| ***H04N 21/6373*** | (2011.01) |
| ***H04N 21/6587*** | (2011.01) |

(52) U.S. Cl.

CPC ............ *G06F 3/011* (2013.01); *G06F 3/1454* (2013.01); *H04L 65/1063* (2013.01); *H04L 65/4092* (2013.01); *H04N 21/21805* (2013.01); *H04N 21/234381* (2013.01); *H04N 21/41407* (2013.01); *H04N 21/6373* (2013.01); *H04N 21/6587* (2013.01); *G09G 2340/0435* (2013.01); *G09G 2350/00* (2013.01); *G09G 2370/022* (2013.01)

(58) Field of Classification Search

None

See application file for complete search history.

(56) References Cited

U.S. PATENT DOCUMENTS

| | | | | |
|---|---|---|---|---|
| 6,628,282 | B1 | 9/2003 | Hertzmann et al. | |
| 9,851,792 | B2 * | 12/2017 | Shanware | G06F 3/013 |
| 9,858,637 | B1 * | 1/2018 | Quach | G02B 27/017 |
| 2012/0092348 | A1 | 4/2012 | McCutchen | |
| 2015/0194125 | A1 * | 7/2015 | Choi | G09G 5/003 345/204 |

(Continued)

OTHER PUBLICATIONS

International Search Report and Written Opinion received for PCT Patent Application No. PCT/US2016/051024, dated Jan. 30, 2017, 12 pages.

*Primary Examiner* — Joseph R Haley
*Assistant Examiner* — Emily J Frank
(74) *Attorney, Agent, or Firm* — Brake Hughes Bellermann LLP

(57) ABSTRACT

A head mount display (HMD) includes a processor and a memory. The memory includes code as instructions that cause the processor to send an indication that a view perspective has changed from a first position to a second position in a streaming video, determine a rate of change associated with the change from a first position to a second position, and reduce a playback frame rate of the video based on the rate of change for the view perspective.

20 Claims, 13 Drawing Sheets

(56) References Cited

U.S. PATENT DOCUMENTS

2015/0249813 A1* 9/2015 Cole .................. H04N 13/0055
386/241
2016/0025972 A1* 1/2016 Wexler ................. H04N 5/2257
348/207.11
2016/0147065 A1* 5/2016 Border ................. G02B 27/017
345/592
2016/0260196 A1* 9/2016 Roimela ................. G06F 3/013
2016/0378176 A1* 12/2016 Shiu ........................ G06F 3/011
345/633

* cited by examiner

PLAYING SPHERICAL VIDEO ON A LIMITED BANDWIDTH CONNECTION

RELATED APPLICATION

This application claims priority to and the benefit of U.S. Provisional Patent Application No. 62/216,585, filed on Sep. 10, 2015, entitled "PLAYING SPHERICAL VIDEO ON A LIMITED BANDWIDTH CONNECTION", the contents of which are incorporated in their entirety herein by reference.

FIELD

Embodiments relate to streaming spherical video.

BACKGROUND

Streaming spherical video (or other three dimensional video) can consume a significant amount of system resources. For example, an encoded spherical video can include a large number of bits for transmission which can consume a significant amount of bandwidth as well as processing and memory associated with encoders and decoders.

SUMMARY

Example embodiments describe systems and methods to optimize streaming spherical video (and/or other three dimensional video) based on movement (e.g., by a playback device and/or a viewer of a video).

According to example embodiments, a head mount display (HMD) includes a processor and a memory. The memory includes code as instructions that cause the processor to send an indication that a view perspective has changed from a first position to a second position in a streaming video, determine a rate of change associated with the change from a first position to a second position, and reduce a playback frame rate of the video based on the rate of change for the view perspective.

Implementations can include one or more of the following features. For example, the rate of change can be determined based on how often the indication of a change in a view perspective is sent. The rate of change can be determined based on a distance between the first position and the second position. The reducing of the playback frame rate of the video can include determining whether the rate of change is below a threshold, and upon determining the rate of change is below the threshold, stopping the playback frame rate. The reducing of the playback frame rate of the video can include determining whether the rate of change is below a threshold, and upon determining the rate of change is below the threshold, replace a portion of the video with a still image. The code as instructions can further cause the processor to determine whether the rate of change is above a threshold, upon determining the rate of change is above the threshold, resume playback of the video at a target playback frame rate, and send an indication that playback of the video at the target playback frame rate has resumed.

According to example embodiments, a streaming server includes a processor and a memory. The memory includes code as instructions that cause the processor to receive an indication that a view perspective has changed from a first position to a second position in a streaming video, receive an indication of a rate of change associated with the change from a first position to a second position, and stream the video using a lower bandwidth having a reduced playback frame rate of the video based on the rate of change for the view perspective.

Implementations can include one or more of the following features. For example, the rate of change can be determined based on how often the indication of a change in a view perspective is sent. The rate of change can be determined based on a distance between the first position and the second position. The streaming of the video using the lower bandwidth can include determining whether the rate of change is below a threshold, and upon determining the rate of change is below the threshold, stopping the streaming of the video. The streaming of the video using the lower bandwidth can include determining whether the rate of change is below a threshold, and upon determining the rate of change is below the threshold, replace a portion of the video with a still image. The code as instructions can further cause the processor to receive an indication that playback of the video at a target playback frame rate has resumed, and stream the video using a bandwidth associated with the target playback frame rate.

According to example embodiments, a streaming server includes a processor and a memory. The memory includes code as instructions that cause the processor to determine whether bandwidth is available to stream a video at a target serving frame rate. Upon determining the bandwidth is available, stream the video at the target serving frame rate. Upon determining the bandwidth is not available determine whether an orientation velocity prediction can predict a next frame position. Upon determining the orientation velocity prediction can predict a next frame position serve a frame of the video with a first buffer area associated with a view perspective, and stream the frame of the video at a first frame rate. Upon determining the orientation velocity prediction can not predict a next frame position serve the frame of the video with a second buffer area, the second buffer area being larger than the first buffer area, and stream the frame of the video at a second frame rate.

Implementations can include one or more of the following features. For example, the video can be a spherical video. The determining of whether bandwidth is available can include time stamping data packets associated with the video, and determining how long the video packets take to reach a destination. The serving of the frame of the video with the first buffer area can include determining a number of pixels to stream based on the view perspective, and determining a number of additional pixels to stream based on the view perspective and a size of the first buffer area. The serving of the frame of the video with the second buffer area can include determining a number of pixels to stream based on the view perspective, and determining a number of additional pixels to stream based on the view perspective and a size of the second buffer area. The streaming of the frame of the video at the first frame rate can include increasing the first frame rate to a target frame rate. The streaming of the frame of the video at the second frame rate can include decreasing the second frame rate to a frame rate greater than or equal to zero frames per second (fps). The streaming audio associated with the video can be modified based on a corresponding frame rate.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
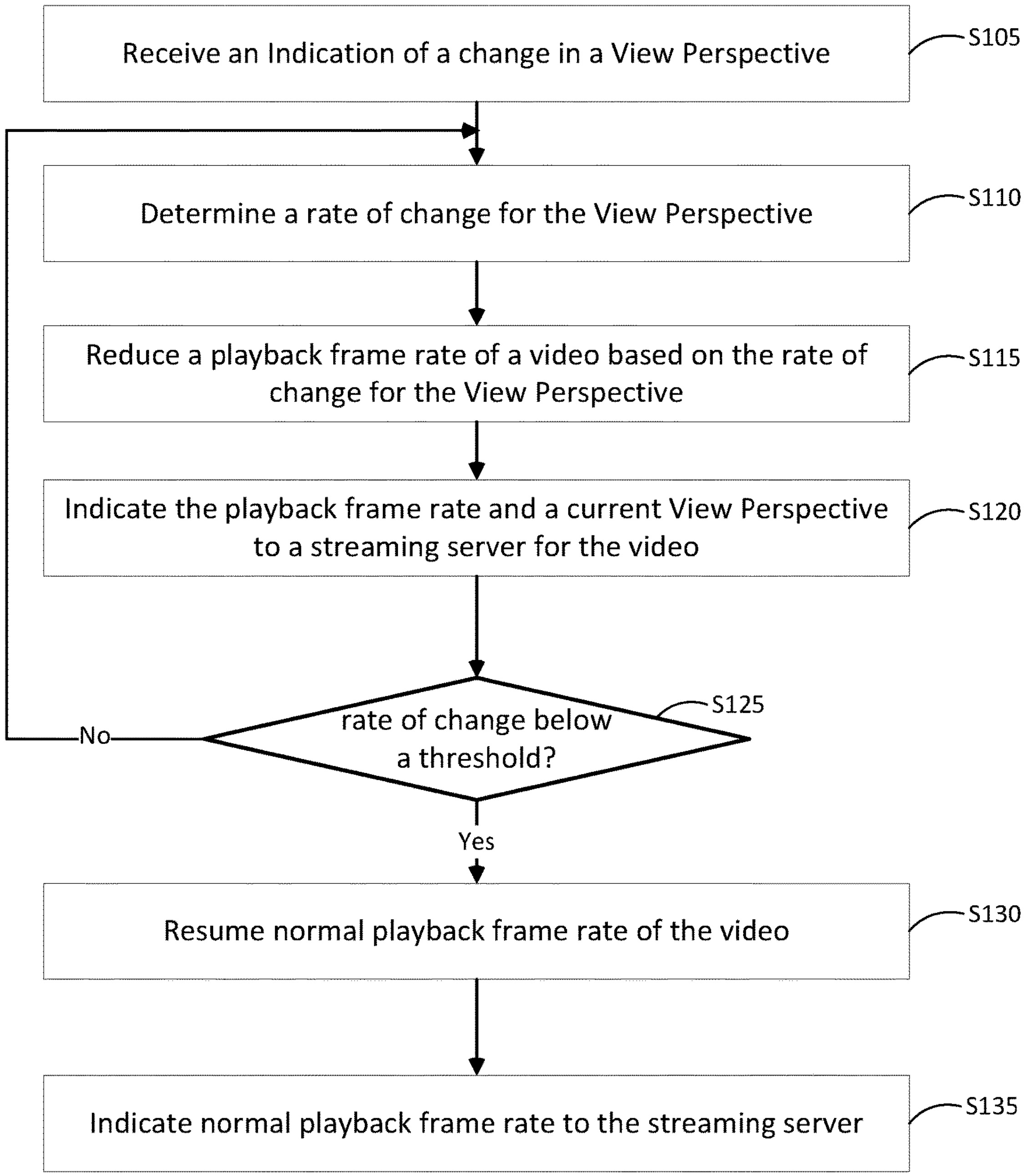
FIG. 1 illustrates a method for streaming spherical video according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

Figure 3:
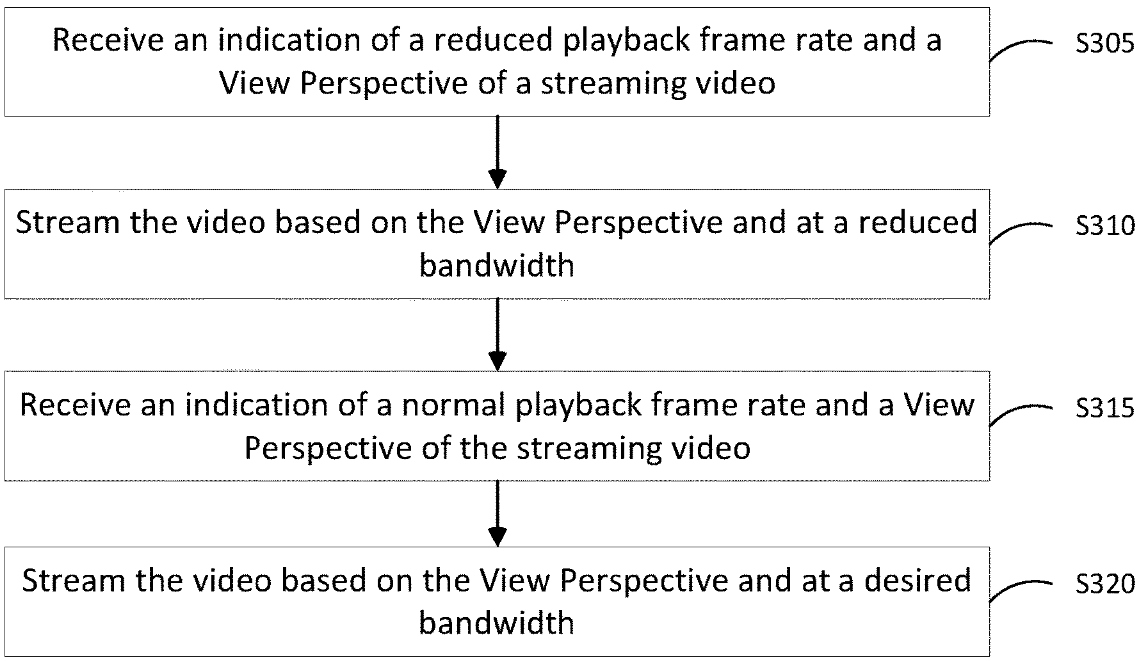
FIGS. 3 and 4 illustrate methods for streaming spherical video according to at least one example embodiment.
Figure 4:
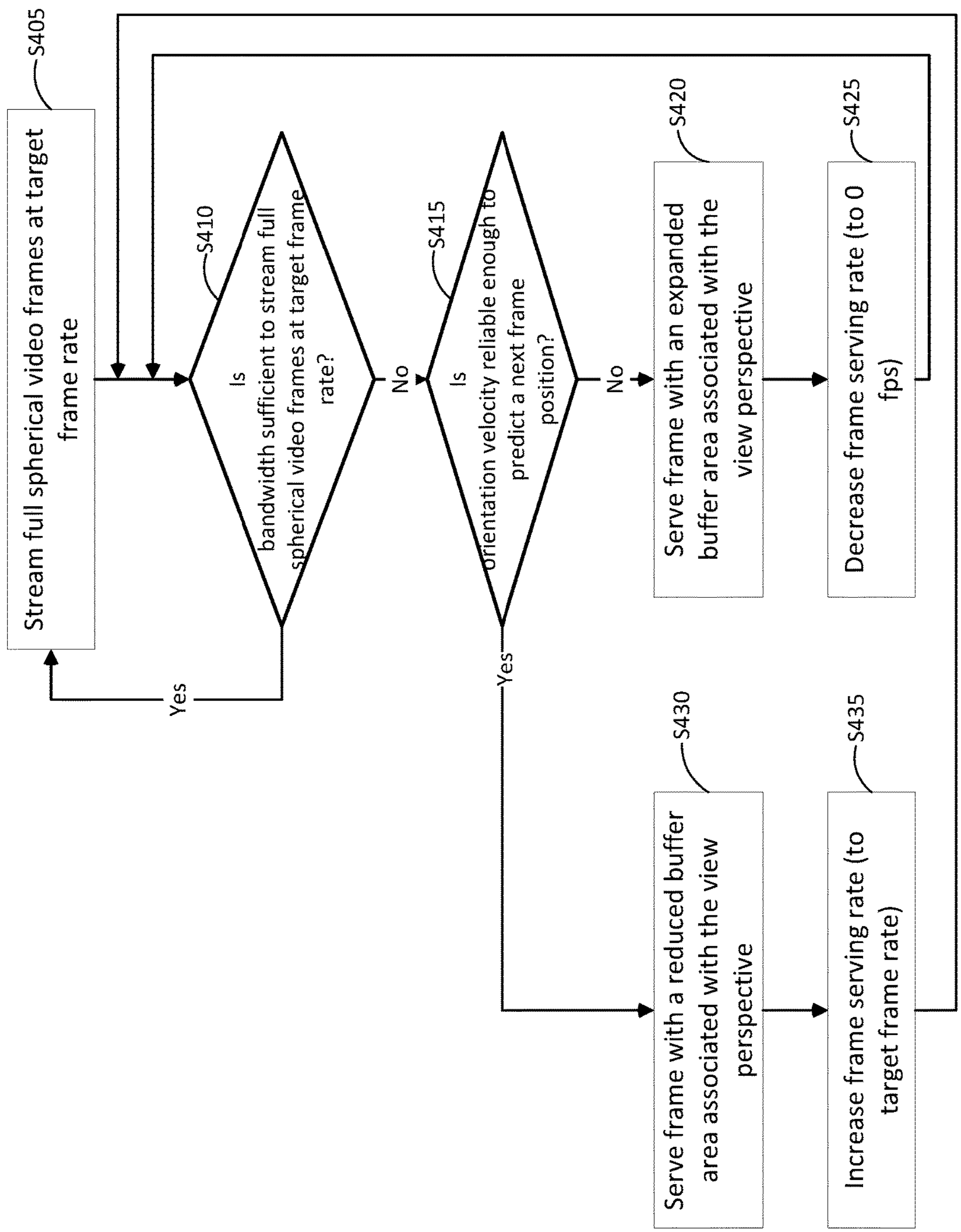
Figure 6A:
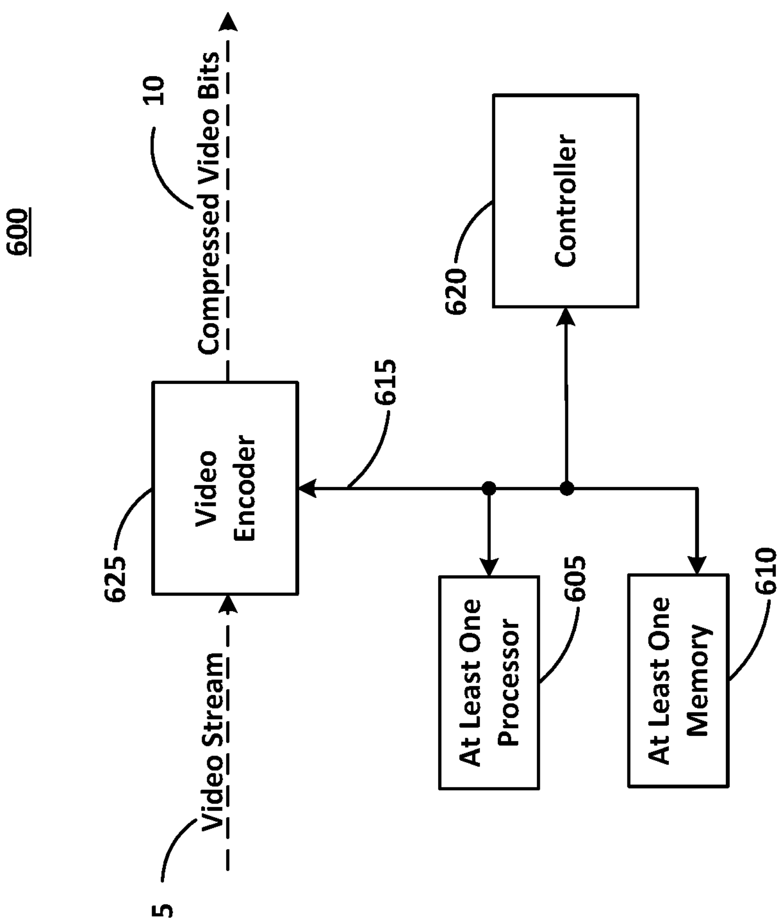
FIG. 6A illustrates a video encoder system according to at least one example embodiment.

FIGS. 1, 3 and 4 are flowcharts of methods according to example embodiments. The steps described with regard to FIGS. 1, 3 and 4 may be performed due to the execution of software code stored in a memory (e.g., at least one memory 610) associated with an apparatus (e.g., as shown in FIG. 6A) and executed by at least one processor (e.g., at least one processor 605) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1, 3 and 4.

FIG. 1 illustrates a method for streaming spherical video according to at least one example embodiment. As shown in FIG. 1, in step S105 an indication of a change in a view perspective is received. For example, a streaming server may receive an indication that a viewer of a spherical video has changed a view perspective from a first position to a second position in the streaming video. In an example use scenario, the streaming video could be of a music concert. As such, the first position could be a view perspective where the band (or members thereof) are seen by the user and the second position could be a view perspective where the crowd is seen by the user. According to an example implementation, the user can be viewing the streaming spherical video using a head-mounted display (HMD). The HMD (and/or an associated computing device) could communicate the indication of the change in view perspective to the streaming server.

In step S110 a rate of change for the view perspective is determined. For example, the rate of change for the view perspective can be a rate of change or velocity at which the view perspective is changing from the first position to the second position in a streaming video. In one example implementation, the indication of the change in view perspective can include the rate of change or velocity at which the view perspective is changing or a velocity at which a viewing device (e.g., HMD) is moving. In another example implementation, the rate of change for the view perspective is determined can be based on how often the indication of a change in a view perspective is received. In other words, the more often an indication of a change in a view perspective is received, the higher the rate of change. Conversely, the less often an indication of a change in a view perspective is received, the lower the rate of change.

In another example implementation, the rate of change for the view perspective can be based on a distance (e.g., between pixels in a frame of video). In this case, the larger the distance, the more rapid the movement and the higher the rate of change. In an example implementation, the HMD can include an accelerometer. The accelerometer can be configured to determine a direction of movement associated with the HMD and the velocity (or how fast) that movement is. The direction of movement can be used to generate the indication of a change in a view perspective and the velocity can be used to indicate the rate of change of the view perspective. Each of which can be communicated from the HMD (or a computing device associated therewith) to the streaming server.

In step S115 a playback frame rate of a video is reduced based on the rate of change for the view perspective. For example, as the view perspective changes more rapidly (e.g., at a relatively high velocity) a viewer sees a more blurry image. Therefore, the playback frame rate of the video can be slowed or stopped when the view perspective changes more rapidly. In an example implementation, the playback frame rate can be stopped (e.g., paused) or a still image can replace a portion of the video upon determining the view perspective change is (or has a velocity) above or greater than a threshold. In another example implementation, the playback frame rate can be reduced (but not stopped) upon determining the view perspective change is (or has a velocity) below or less than the threshold. In other words, the playback frame rate could be slowed if the view perspective change is less than the threshold. The threshold may be a system configuration parameter set, for example, by default or during an initialization of the system. In another example implementation, the frame rate can be variable set based on a plurality of threshold ranges or based on a predetermined formula or algorithm.

In step S120 the playback frame rate and a current view perspective is indicated to a streaming server for the video. For example, in one example implementation the HMD (or a computing device associated therewith) can perform the methods associated with changing frame rate. In this implementation, the playback frame rate and the current view perspective can be communicated to a streaming server over a wired or wireless connection using a wired or wireless protocol. In another implementation, a separate computing device can control the playback frame rate (as displayed on, for example, a HMD). This computing device could be an element of a larger (e.g., networked or local area network) computing system. In this implementation, the playback frame rate and the current view perspective can be concurrently communicated to the streaming server and the HMD over a wired and/or wireless connection using a wired and/or wireless protocol from the computing device.

In step S125, it is determined whether the rate of change is below a threshold. The threshold may be a system configuration parameter set, for example, by default or during an initialization of the system. In another example implementation, the frame rate can be variable set based on a plurality of threshold ranges or based on a predetermined formula or algorithm. Upon determining the rate of change is below the threshold, processing continues to step S130. Otherwise, processing returns to step S110.

In step S130 a normal playback frame rate of the video is resumed. For example, the video can have a frame rate at which the video is best viewed. This frame rate can be considered a normal or target frame rate. The normal frame rate can be based on a rate at which the video was captured. The normal frame rate can be based on a rate at which a creator of the video intends (e.g., configures) the video to be viewed.

In step S135 the normal playback frame rate is indicated to the streaming server. For example, in one example implementation the HMD (or a computing device associated therewith) can perform the methods associated with changing frame rate. In this implementation, the normal playback frame rate can be communicated to the streaming server over a wired or wireless connection using a wired or wireless protocol. In another implementation, a separate computing device can control the playback frame rate (as displayed on, for example, a HMD). This computing device could be an element of a larger (e.g., networked or local area network) computing system. In this implementation, the normal playback frame rate can be concurrently communicated to the streaming server and the HMD over a wired and/or wireless connection using a wired and/or wireless protocol from the computing device.

A spherical image can have perspective. For example, a spherical image could be an image of a globe. An inside perspective could be a view from a center of the globe looking outward. Or the inside perspective could be on the globe looking out to space. In other words, an inside perspective is an inside-out point of view. An outside perspective could be a view from space looking down toward the globe. In other words, an outside perspective is an outside-in point of view. Inside perspective and outside perspective consider the spherical image and/or spherical video frame as a whole.

However, in example implementations, it is likely that a user (e.g., of a HMD) can only see or view a portion of the spherical image and/or spherical video frame. Accordingly, perspective can be based on that which is viewable. Hereinafter, this will be referred to as viewable perspective. In other words, a viewable perspective can be that which can be seen by a viewer during a playback of the spherical video. The viewable perspective can be a portion of the spherical image that is in front of the viewer during playback of the spherical video. In other words, the viewable perspective is a portion of the spherical image that is within a viewable range of a viewer of the spherical image.

For example, when viewing from an inside perspective, a viewer could be lying on the ground (e.g., earth) and looking out to space (e.g., an inside-out point of view). The viewer may see, in the image, the moon, the sun or specific stars. However, although the ground the viewer is lying on is included in the spherical image, the ground is outside the current viewable perspective. In this example, the viewer could turn her head and the ground would be included in a peripheral viewable perspective. The viewer could flip over and the ground would be in the viewable perspective whereas the moon, the sun or stars would not.

Continuing the Earth example, a viewer could be in space looking at the earth. A viewable perspective from an outside perspective may be a portion of the spherical image that is not blocked (e.g., by another portion of the image) and/or a portion of the spherical image that has not curved out of view. For example, viewing from the North Pole, the view perspective would include Arctica, but Antarctica would not be included. Further, a portion of North America (e.g., Canada) may be within the viewable perspective, but due to the curvature of the sphere, other portions of North America (e.g., The United States) may not be within the viewable perspective.

Another portion of the spherical image may be brought into a viewable perspective from an outside perspective by moving (e.g., rotating) the spherical image and/or by movement of the spherical image.

A spherical image is an image that does not change with respect to time. For example, a spherical image from an inside perspective as relates to the earth may show the moon and the stars in one position. Whereas a spherical video (or sequence of images) may change with respect to time. For example, a spherical video from an inside perspective as relates to the earth may show the moon and the stars moving (e.g., because of the earth's rotation) and/or an airplane streak across the image (e.g., the sky).

Figure 2A:
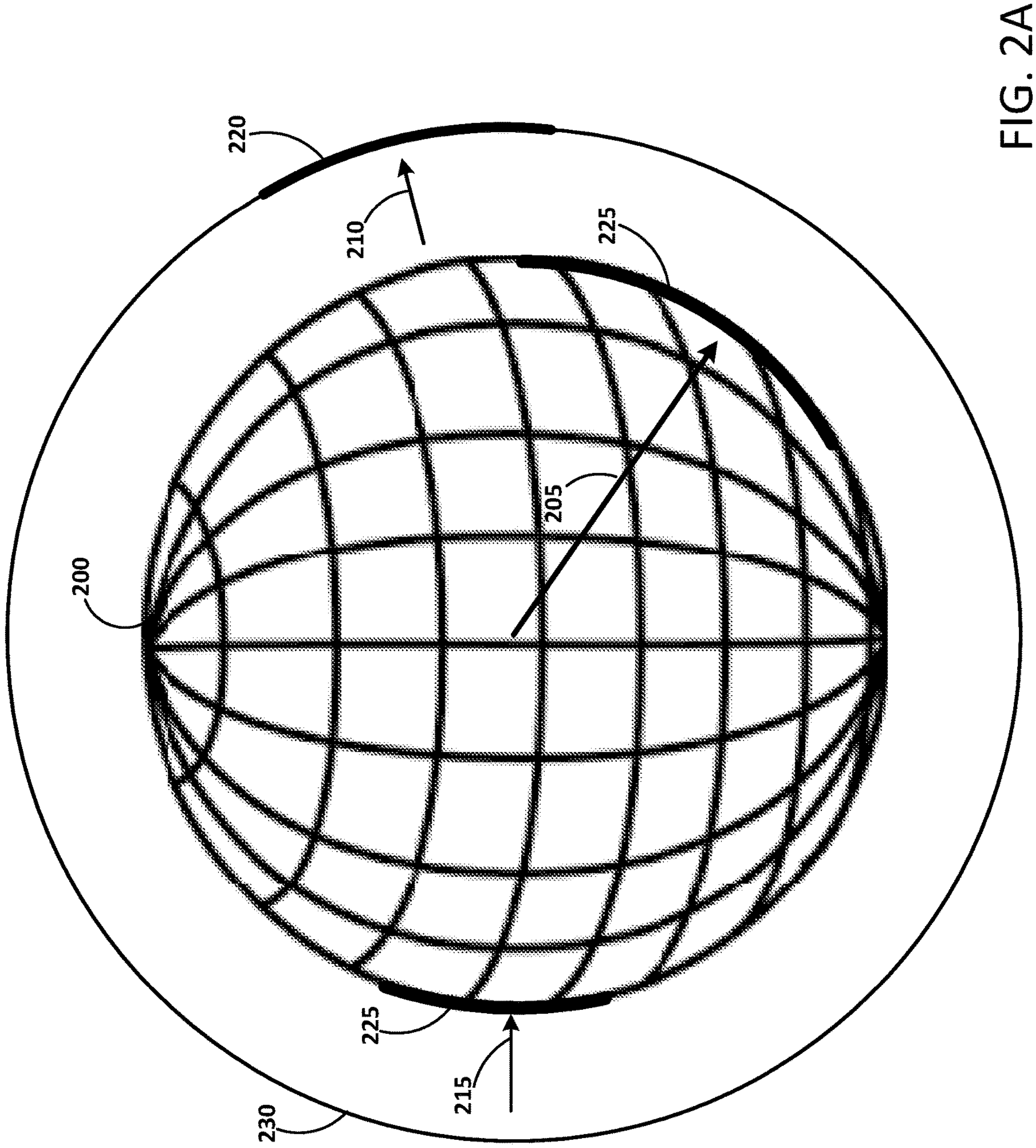
FIG. 2A illustrates a two dimensional (2D) representation of a sphere according to at least one example embodiment.

FIG. 2A is a two dimensional (2D) representation of a sphere. As shown in FIG. 2A, the sphere 200 (e.g., as a spherical image or frame of a spherical video) illustrates a direction of inside perspective 205, 210, outside perspective 215 and viewable perspective 220, 225, 230. The viewable perspective 220 may be a portion of a spherical image 235 as viewed from inside perspective 210. The viewable perspective 220 may be a portion of the sphere 200 as viewed from inside perspective 205. The viewable perspective 225 may be a portion of the sphere 200 as viewed from outside perspective 215.

Figure 2B:
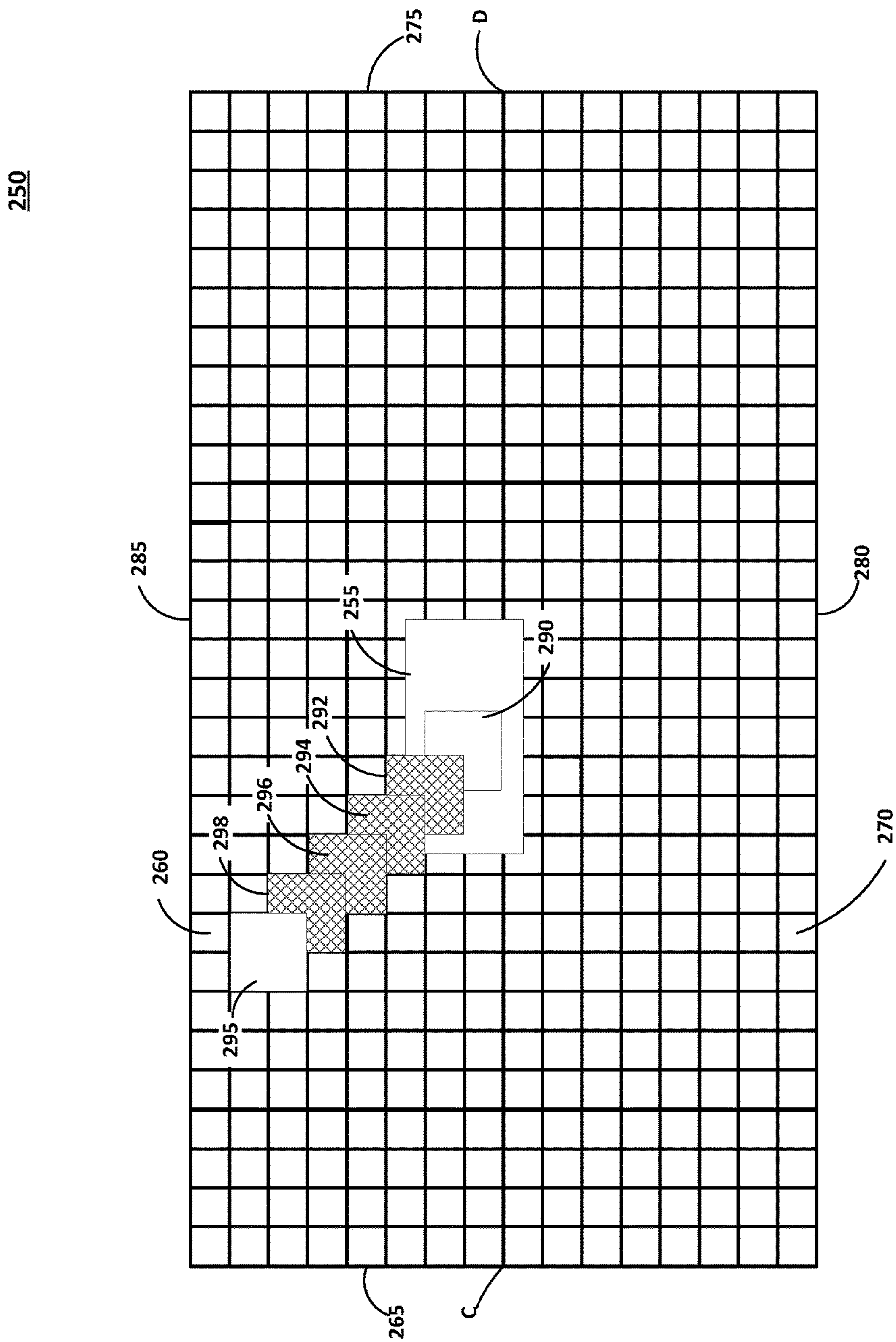
FIG. 2B illustrates an equirectangular representation of a sphere according to at least one example embodiment.

FIG. 2B illustrates an unwrapped equirectangular representation 250 of the 2D representation of a sphere 200 as a 2D rectangular representation. An equirectangular projection of an image shown as an unwrapped cylindrical representation 250 may appear as a stretched image as the image progresses vertically or horizontally. The 2-D rectangular representation can be decomposed as a C×R matrix of N×N blocks. For example, as shown in FIG. 2B, the illustrated unwrapped cylindrical representation 250 is a 30×16 matrix of N×N blocks. However, other C×R dimensions are within the scope of this disclosure. The blocks may be 2×2, 2×4, 4×4, 4×8, 8×8, 8×16, 16×16, and the like blocks (or blocks of pixels).

A spherical image is an image that is continuous in all directions. Accordingly, if the spherical image were to be decomposed into a plurality of blocks, the plurality of blocks would be contiguous over the spherical image. In other words, there are no edges or boundaries as in a 2D image. In example implementations, an adjacent end block may be adjacent to a boundary of the 2D representation. In addition, an adjacent end block may be a contiguous block to a block on a boundary of the 2D representation. For example, the adjacent end block being associated with two or more boundaries of the two dimensional representation. In other words, because a spherical image is an image that is continuous in all directions, an adjacent end can be associated with a top boundary (e.g., of a column of blocks) and a bottom boundary in an image or frame and/or associated with a left boundary (e.g., of a row of blocks) and a right boundary in an image or frame.

For example, if an equirectangular projection is used, an adjacent end block may be the block on the other end of the column or row. For example, as shown in FIG. 2B block 260 and 270 may be respective adjacent end blocks (by column) to each other. Further, block 280 and 285 may be respective adjacent end blocks (by column) to each other. Still further, block 265 and 275 may be respective adjacent end blocks (by row) to each other. A view perspective 255 may include (and/or overlap) at least one block. Blocks may be encoded as a region of the image, a region of the frame, a portion or subset of the image or frame, a group of blocks and the like. Hereinafter this group of blocks may be referred to as a tile or a group of tiles. A tile may be a plurality of pixels selected based on a view perspective of a viewer during playback of the spherical viewer. The plurality of pixels may be a block, plurality of blocks or macro-block that can include a portion of the spherical image that can be seen by the user. For example, tiles 290 and 295 are illustrated as a group of four blocks in FIG. 2B. Tile 290 is illustrated as being within view perspective 255.

In the example embodiments, a viewer may change a view perspective 255 from a current view perspective including tile 290 to a target view perspective including tile 295. Along the way, a viewer may be shown one or more other tiles 292, 294, 296, 298. For illustrative clarity, view perspectives are not shown to include tiles 292, 294, 295, 296, and 298. However, view perspectives (e.g., view perspective 255) can be considered to follow with tiles 292, 294, 295, 296, and 298. According to example embodiments, a spherical video may include the change in view perspective 255 from a current view perspective including tile 290 to a target view perspective including tile 295. As such the spherical video may include one or more frames including tiles 290, 292, 294, 295, 296, and 298. Upon determining the change in view perspective 255 from the current view perspective including tile 290 to the target view perspective including tile 295 is above a threshold velocity, the frame rate for playing back the spherical video may be reduced or stopped. In other words, one or more of the tiles 290, 292, 294, 295, 296, and/or 298 may be displayed as a still image.

In a head mount display (HMD), a viewer experiences a visual virtual reality through the use of a left (e.g., left eye) display and a right (e.g., right eye) display that projects a perceived three-dimensional (3D) video or image. According to example embodiments, a spherical (e.g., 3D) video or image is stored on a server. The video or image can be encoded and streamed to the HMD from the server. The spherical video or image can be encoded as a left image and a right image which packaged (e.g., in a data packet) together with metadata about the left image and the right image. The left image and the right image are then decoded and displayed by the left (e.g., left eye) display and the right (e.g., right eye) display.

The system(s) and method(s) described herein are applicable to both the left image and the right image and are referred to throughout this disclosure as an image, frame, a portion of an image, a portion of a frame, a tile and/or the like depending on the use case. In other words, the encoded data that is communicated from a server (e.g., streaming server) to a user device (e.g., a HMD) and then decoded for display can be a left image and/or a right image associated with a 3D video or image.

FIG. 3 illustrates another method for streaming spherical video according to at least one example embodiment. As shown in FIG. 3, in step S305 an indication of a reduced playback frame rate and a view perspective of a streaming video is received. For example, a streaming server can receive a communication from a HMD (or a computing device associated therewith). The communication can be a wired or wireless communication transmitted using a wired or wireless protocol. The communication can include the indication of the reduced playback frame rate and the view perspective. The indication of the reduced playback frame rate can be a relative value (e.g., decrease the current frame rate by a number, a percentage and/or the like), a fixed value (e.g., x fps, where x is a numerical value) and/or an indication that a still image (e.g., 0 fps) is requested or should be communicated. The indication of the view perspective can be a relative value (e.g., position delta from the current position) and/or a fixed position. The indication can be a spherical representation (e.g., a point or position on the sphere 200), an equirectangular representation and/or a rectangular representation (e.g., a point or position on the unwrapped cylindrical representation 250).

In step S310 the video is streamed based on the view perspective and at a reduced bandwidth. For example, the streaming server can select a portion of the spherical video (e.g., a tile or a number of tiles) for streaming based on the view perspective. In other words, the streaming server can select a portion of the spherical video at (or centered at) the position associated with the view perspective. In an example implementation, the selected portion of the spherical video can be a still image (e.g., 0 fps). The selected portion of the spherical video can then be communicated (or streamed) to the HMD (or a computing device associated therewith). In addition, streaming audio associated with the video can be modified based on the reduced bandwidth. For example, the audio can be removed, slowed, faded out, an audio segment can be looped or repeated and/or the like. Looped or repeated audio segments can have a duration modified for each subsequent video frame. For example, the loop can progressively made longer. The selected portion of the spherical video and/or audio can then be communicated via a wired or wireless communication transmitted using a wired or wireless protocol.

In step S315 an indication of a normal playback frame rate and a view perspective of the streaming video is received. For example, a streaming server can receive a communication from a HMD (or a computing device associated therewith). The communication can be a wired or wireless communication transmitted using a wired or wireless protocol. The communication can include the indication of normal (e.g., target) playback frame rate and the view perspective. The indication of the normal playback frame rate can be a relative value (e.g., increase the current frame rate by a number, a percentage and/or the like), a fixed value (e.g., x fps, where x is a numerical value) and/or an indication that a normal or target frame rate (or resumption of thereof) is requested or should be communicated. The indication of the view perspective can be a relative value (e.g., position delta from the current position) and/or a fixed position. The indication can be a spherical representation (e.g., a point or position on the sphere 200), an equirectangular representation and/or a rectangular representation (e.g., a point or position on the unwrapped cylindrical representation 250).

In step S320 the video is streamed based on the view perspective and at a desired bandwidth. For example, the streaming server can select a portion of the spherical video (e.g., a tile or a number of tiles) for streaming based on the view perspective. In other words, the streaming server can select a portion of the spherical video at (or centered at) the position associated with the view perspective. The selected portion of the spherical video can then be communicated (or streamed) to the HMD (or a computing device associated therewith).

In addition, streaming audio associated with the video can be modified based on the resumed normal playback frame rate and the modification based on the reduced bandwidth. For example, the audio can be reinserted, sped to normal speed, faded in, an audio segment can be resumed and/or the like. While looping or repeating audio, a matching point in the video can be determined and the associated audio stream can be resumed at the matching point. Further, the audio can be faded in regardless of the current position of the looping in the audio playback. The selected portion of the spherical video can then be communicated via a wired or wireless communication transmitted using a wired or wireless protocol.

In some spherical video streaming techniques, a portion of (or less than all) of the spherical video is streamed to the HMD (or a computing device associated therewith). Alternatively, a viewing portion of the spherical video (e.g., based on the view perspective) is streamed at a higher quality than a portion of the spherical video that is not within a viewable area of the HMD. In these techniques, determining where a viewer is viewing (or going to view in the near future) and communicating (or streaming) these portions of the spherical video to the HMD efficiently can affect the viewing experience during playback of the spherical video. Accordingly, portions of the spherical video can be streamed based on bandwidth of the network over which packets including the spherical video will be communicated and a reliability of a predicted next portion to be viewed.

FIG. 4 illustrates still another method for streaming spherical video according to at least one example embodiment. As shown in FIG. 4, in step S405 full spherical video frames are streamed at a target frame rate. For example, a streaming server can communicate a series of frames of a spherical video (or portions thereof) to a HMD (or a computing device associated therewith). The frames of the spherical video can be communicated via a wired or wireless communication transmitted using a wired or wireless protocol. The frames can be communicated at a target frame rate or frames per second (fps). The target frame rate can be based on a requested frame rate, a rate at which the video was captured, a rate at which a creator of the video intends (e.g., configures) the video to be viewed, a desired quality of the video when viewed, characteristics (e.g., memory, processing capabilities and the like) of a playback device (e.g., HMD) and/or characteristics (e.g., memory, processing capabilities and the like) of a network device (e.g., streaming server).

In step S410 whether a bandwidth is sufficient to stream the full spherical video frames at the target frame rate is determined. For example, in order to stream the spherical video at the target frame rate and, for example, a desired or minimum quality, a minimum bandwidth associated with the network over which the spherical video is to be streamed may be necessary. Bandwidth can be the amount of data that passes through a network connection over time as measured in, for example, bits per second (bps). Bandwidth can be measured independently of the streaming of the spherical video. For example, a tool can regularly measure bandwidth by, for example, sending large amounts of data and measuring the amount of time the data takes to get to a location. Bandwidth can be measured based on the streaming of the spherical video. For example, video data packets can be time stamped and a reporting/monitoring tool can be used to determine how long the video packets (of known size) take to reach the HMD (or a computing device associated therewith). If the network is not capable of streaming the spherical video with a sufficient bandwidth, a user experience may be compromised (e.g., not to a desired quality). If bandwidth is sufficient to stream the full spherical video frames at the target frame rate, processing returns to step S405. Otherwise, processing continues to step S415.

In step S415 whether an orientation velocity is reliable enough to predict a next position within a frame is determined. For example, as a user of a HMD moves her head at a velocity (e.g., variable velocity), an orientation sensor (e.g., accelerometer) can measure the velocity and direction of movement. A higher measured velocity may be less reliable because a video system may have more errors associated with predicting the next position (e.g., view perspective) within a frame for streaming the video. Changes in direction may also be less reliable because a video system may have more errors associated with predicting the next position within a frame for streaming the video. Other orientation velocity scenarios (e.g., position changes to or from action points in the video, head shaking, concurrent movement of head and eyes, and/or the like) may introduce errors with regard predict the next position within a frame. If the orientation velocity is reliable enough to predict the next position, processing continues to step S430. Otherwise processing continues to step S420.

If the orientation velocity is not reliable enough to predict the next position, a larger portion (e.g., number of tiles) around the predicted next position can be determined and streamed. Therefore, during playback of spherical video, it is more likely that the portion of the spherical video that the user of the HMD is looking at is streamed to the HMD (and at a desired quality). In addition, above it was determined that bandwidth is insufficient to stream the full spherical video frames at the target frame rate. Therefore, in this example implementation, with the larger portion of the spherical video (or increased number of bits) being transmitted, frame rate should decrease in order to stream video packets in the available bandwidth.

Accordingly, in step S420 a frame is served with an expanded buffer area associated with (e.g., around or surrounding or on one or more sides of) the view perspective. For example, a view perspective can be a position of the spherical video at which the viewer is looking. That position could be pixel within the spherical video. A buffer area can be portion of the spherical video surrounding the pixel. The buffer area can be a number of pixels, a number of blocks, a number of tiles and/or the like. The buffer area can be based on a display of the HMD. For example, the buffer area can be equivalent to the number of pixels, the number of blocks, the number of tiles and/or the like that can be displayed on a display(s) of the HMD. A viewer of the spherical video using the HMD may only be capable of viewing a portion of an image displayed on the display(s) of the HMD. Therefore, the buffer area can be equivalent to the number of pixels, the number of blocks, the number of tiles and/or the like that can be seen by a user when displayed on a display(s) of the HMD. Other, and alternative, implementations for determining a buffer area are within the scope of this disclosure.

In an example implementation, the buffer area may be expanded to compensate for the reliability (or lack thereof) of predicting the next position within a frame of the spherical video to be streamed to the HMD. The expanded buffer may be based on a value (or score) assigned to the reliability. For example, a less reliable prediction may be assigned a higher value (or score). The higher the value (or score), the more the buffer area could be expanded. As a result, the greater the number of pixels, the number of blocks, the number of tiles and/or the like should be selected for streaming to the HMD.

In step S425 the frame serving rate is decreased (e.g., to 0 fps). For example, the frame rate can be decreased based on the bandwidth and the number of pixels, the number of blocks, the number of tiles and/or the like selected for streaming to the HMD. In other words, the lower the available bandwidth and the larger the buffer area, the lower the frame rate should be. In some example implementations, a still image (e.g., 0 fps) of the portion of the spherical image bound by the expanded buffer is streamed.

If the orientation velocity is reliable enough to predict the next position, a smaller portion (e.g., number of tiles) around the predicted next position can be determined and streamed. Therefore, with the bandwidth being insufficient to stream the full spherical video frames at the target frame rate, in this example implementation, with the smaller portion of the spherical video (or decreased number of bits) being transmitted, frame rate should approach the target frame rate during streaming of video packets in the available bandwidth. In addition, streaming audio associated with the video can be modified based on the reduced bandwidth. For example, the audio can be removed, slowed, faded out, an audio segment can be looped or repeated and/or the like. Looped or repeated audio segments can have a duration modified for each subsequent video frame. For example, the loop can progressively made longer.

In step S430 the frame is served with a reduced buffer area associated with (e.g., around or surrounding or on one or more sides of) the view perspective. As discussed above, the buffer area can be equivalent to the number of pixels, the number of blocks, the number of tiles and/or the like that can be displayed on a display(s) of the HMD. Therefore, reducing the buffer area can result in an image with filler pixels (e.g., black, white, grey, and the like) around the periphery of a viewable area during playback. In the scenario where the typical buffer area exceeds a displayable area of a display(s) of a HMD, a reduced buffer area may not be perceived by a viewer using the HMD. However, reducing the buffer area can reduce the number of bits representing the spherical video during streaming.

In step S435 the serving frame rate is increased (e.g., to target frame rate). For example, in an example implementation where the frame rate is below the target frame rate, the serving frame rate can be increased to approach or meet the target frame rate. Given the number of bits based on the reduced buffer area, the frame rate can be limited to the constraint of not exceeding the available bandwidth. Accordingly, if the target frame rate is not achieved, step S430 and S435 can repeat until the target frame rate is achieved and/or some minimum buffer area is reached.

In addition, streaming audio associated with the video can be modified based on the resumed normal playback frame rate (e.g., at step S405 and/or S435) and the modification based on the reduced bandwidth. For example, the audio can be reinserted, sped to normal speed, faded in, an audio segment can be resumed and/or the like. While looping or repeating audio, a matching point in the video can be determined and the associated audio stream can be resumed at the matching point. Further, the audio can be faded in regardless of the current position of the looping in the audio playback.

Figure 5:
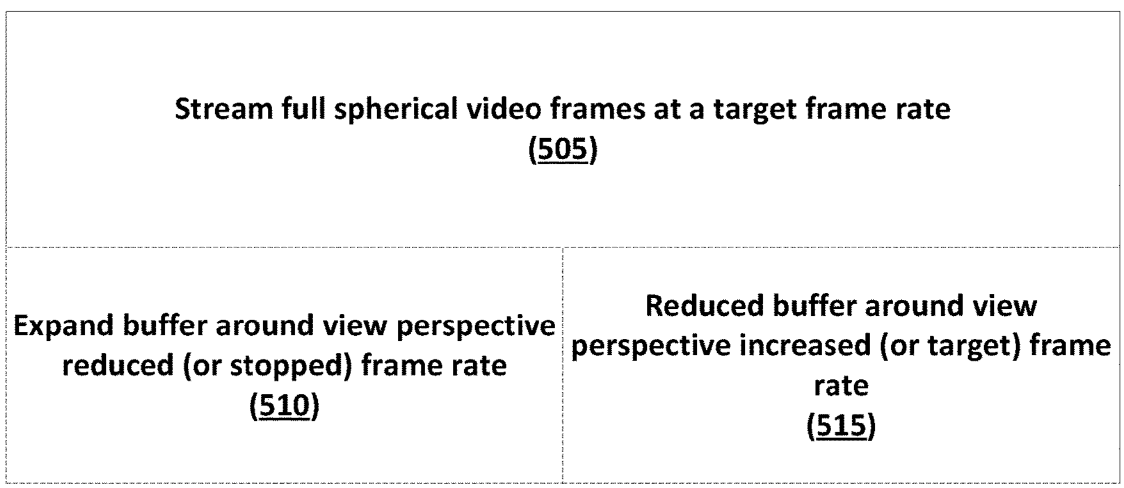
FIG. 5 illustrates a diagram of frame rate selections according to at least one example embodiment.

FIG. 5 illustrates a diagram of frame rate selections according to at least one example embodiment. The diagram shown in FIG. 5 illustrates the three possible results of implementing the method of FIG. 4. As shown in FIG. 5, if bandwidth is not limited, full spherical video frames can be streamed at a target frame rate (505). If bandwidth is limited and a next position in a frame can be reliably predicted, a buffer area around a view perspective can be reduced and a frame rate can be increased or set to a target frame rate (515). If bandwidth is limited and a next position in a frame can not be reliably predicted, a buffer area around a view perspective can be increased and a frame rate can be decreased or set to zero fps (e.g., a still image) (510).

In the example of FIG. 6A, a video encoder system 600 may be, or may include, at least one computing device and can represent virtually any computing device configured to perform the methods described herein. As such, the video encoder system 600 can include various components which may be utilized to implement the techniques described herein, or different or future versions thereof. By way of example, the video encoder system 600 is illustrated as including at least one processor 605, as well as at least one memory 610 (e.g., a non-transitory computer readable storage medium).

FIG. 6A illustrates the video encoder system according to at least one example embodiment. As shown in FIG. 6A, the video encoder system 600 includes the at least one processor 605, the at least one memory 610, a controller 620, and a video encoder 625. The at least one processor 605, the at least one memory 610, the controller 620, and the video encoder 625 are communicatively coupled via bus 615.

The at least one processor 605 may be utilized to execute instructions stored on the at least one memory 610, so as to thereby implement the various features and functions described herein, or additional or alternative features and functions. The at least one processor 605 and the at least one memory 610 may be utilized for various other purposes. In particular, the at least one memory 610 can represent an example of various types of memory and related hardware and software which might be used to implement any one of the modules described herein.

The at least one memory 610 may be configured to store data and/or information associated with the video encoder system 600. For example, the at least one memory 610 may be configured to store codecs associated with encoding spherical video. For example, the at least one memory may be configured to store code associated with selecting a portion of a frame of the spherical video as a tile to be encoded separately from the encoding of the spherical video. The at least one memory 610 may be a shared resource. For example, the video encoder system 600 may be an element of a larger system (e.g., a server, a personal computer, a mobile device, and the like). Therefore, the at least one memory 610 may be configured to store data and/or information associated with other elements (e.g., image/video serving, web browsing or wired/wireless communication) within the larger system.

The controller 620 may be configured to generate various control signals and communicate the control signals to various blocks in video encoder system 600. The controller 620 may be configured to generate the control signals to implement the techniques described above. The controller 620 may be configured to control the video encoder 625 to encode an image, a sequence of images, a video frame, a video sequence, and the like according to example embodiments. For example, the controller 620 may generate control signals corresponding to parameters for encoding spherical video.

The video encoder 625 may be configured to receive a video stream input 5 and output compressed (e.g., encoded) video bits 10. The video encoder 625 may convert the video stream input 5 into discrete video frames. The video stream input 5 may also be an image, accordingly, the compressed (e.g., encoded) video bits 10 may also be compressed image bits. The video encoder 625 may further convert each discrete video frame (or image) into a matrix of blocks (hereinafter referred to as blocks). For example, a video frame (or image) may be converted to a 16×16, a 16×8, an 8×8, a 4×4 or a 2×2 matrix of blocks each having a number of pixels. Although five example matrices are listed, example embodiments are not limited thereto.

The compressed video bits 10 may represent the output of the video encoder system 600. For example, the compressed video bits 10 may represent an encoded video frame (or an encoded image). For example, the compressed video bits 10 may be ready for transmission to a receiving device (not shown). For example, the video bits may be transmitted to a system transceiver (not shown) for transmission to the receiving device.

The at least one processor 605 may be configured to execute computer instructions associated with the controller 620 and/or the video encoder 625. The at least one processor 605 may be a shared resource. For example, the video encoder system 600 may be an element of a larger system (e.g., a mobile device). Therefore, the at least one processor 605 may be configured to execute computer instructions associated with other elements (e.g., image/video serving, web browsing or wired/wireless communication) within the larger system.

Figure 6B:
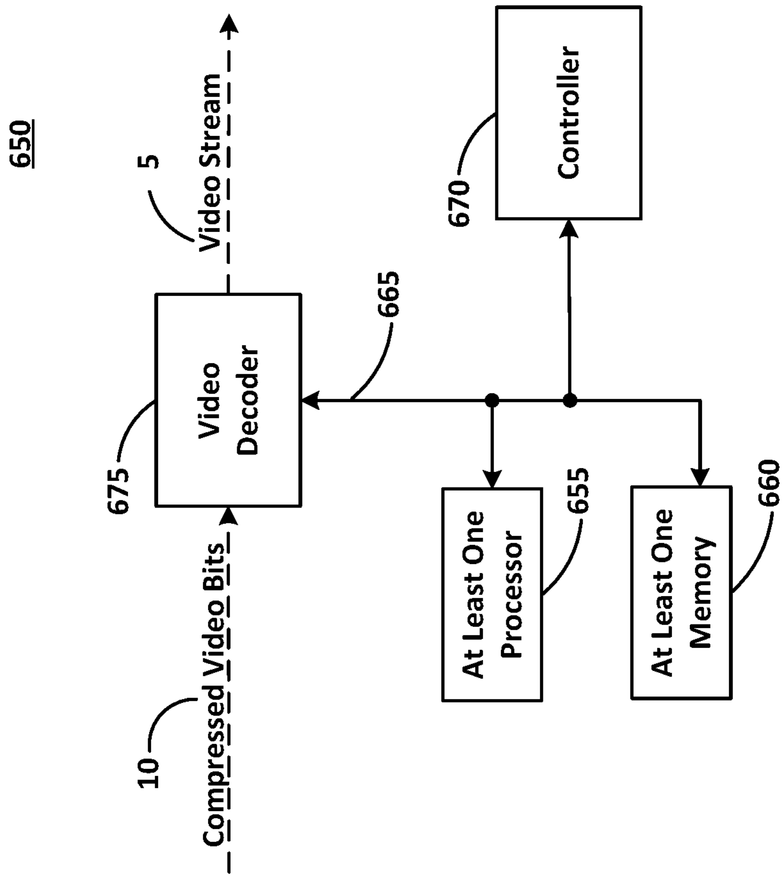
FIG. 6B illustrates a video decoder system according to at least one example embodiment.

In the example of FIG. 6B, a video decoder system 650 may be at least one computing device and can represent virtually any computing device configured to perform the methods described herein. As such, the video decoder system 650 can include various components which may be utilized to implement the techniques described herein, or different or future versions thereof. By way of example, the video decoder system 650 is illustrated as including at least one processor 655, as well as at least one memory 660 (e.g., a computer readable storage medium).

Thus, the at least one processor 655 may be utilized to execute instructions stored on the at least one memory 660, so as to thereby implement the various features and functions described herein, or additional or alternative features and functions. The at least one processor 655 and the at least one memory 660 may be utilized for various other purposes. In particular, the at least one memory 660 can represent an example of various types of memory and related hardware and software which might be used to implement any one of the modules described herein. According to example embodiments, the video encoder system 600 and the video decoder system 650 may be included in a same larger system (e.g., a personal computer, a mobile device and the like). According to example embodiments, video decoder system 650 may be configured to implement the reverse or opposite techniques described with regard to the video encoder system 600.

The at least one memory 660 may be configured to store data and/or information associated with the video decoder system 650. For example, the at least one memory 610 may be configured to store codecs associated with decoding encoded spherical video data. For example, the at least one memory may be configured to store code associated with decoding an encoded tile and a separately encoded spherical video frame as well as code for replacing pixels in the decoded spherical video frame with the decoded tile. The at least one memory 660 may be a shared resource. For example, the video decoder system 650 may be an element of a larger system (e.g., a personal computer, a mobile device, and the like). Therefore, the at least one memory 660 may be configured to store data and/or information associated with other elements (e.g., web browsing or wireless communication) within the larger system.

The controller 670 may be configured to generate various control signals and communicate the control signals to various blocks in video decoder system 650. The controller 670 may be configured to generate the control signals in order to implement the video decoding techniques described below. The controller 670 may be configured to control the video decoder 675 to decode a video frame according to example embodiments. The controller 670 may be configured to generate control signals corresponding to decoding video.

The video decoder 675 may be configured to receive a compressed (e.g., encoded) video bits 10 input and output a video stream 5. The video decoder 675 may convert discrete video frames of the compressed video bits 10 into the video stream 5. The compressed (e.g., encoded) video bits 10 may also be compressed image bits, accordingly, the video stream 5 may also be an image.

The at least one processor 655 may be configured to execute computer instructions associated with the controller 670 and/or the video decoder 675. The at least one processor 655 may be a shared resource. For example, the video decoder system 650 may be an element of a larger system (e.g., a personal computer, a mobile device, and the like). Therefore, the at least one processor 655 may be configured to execute computer instructions associated with other elements (e.g., web browsing or wireless communication) within the larger system.

Figure 7A:
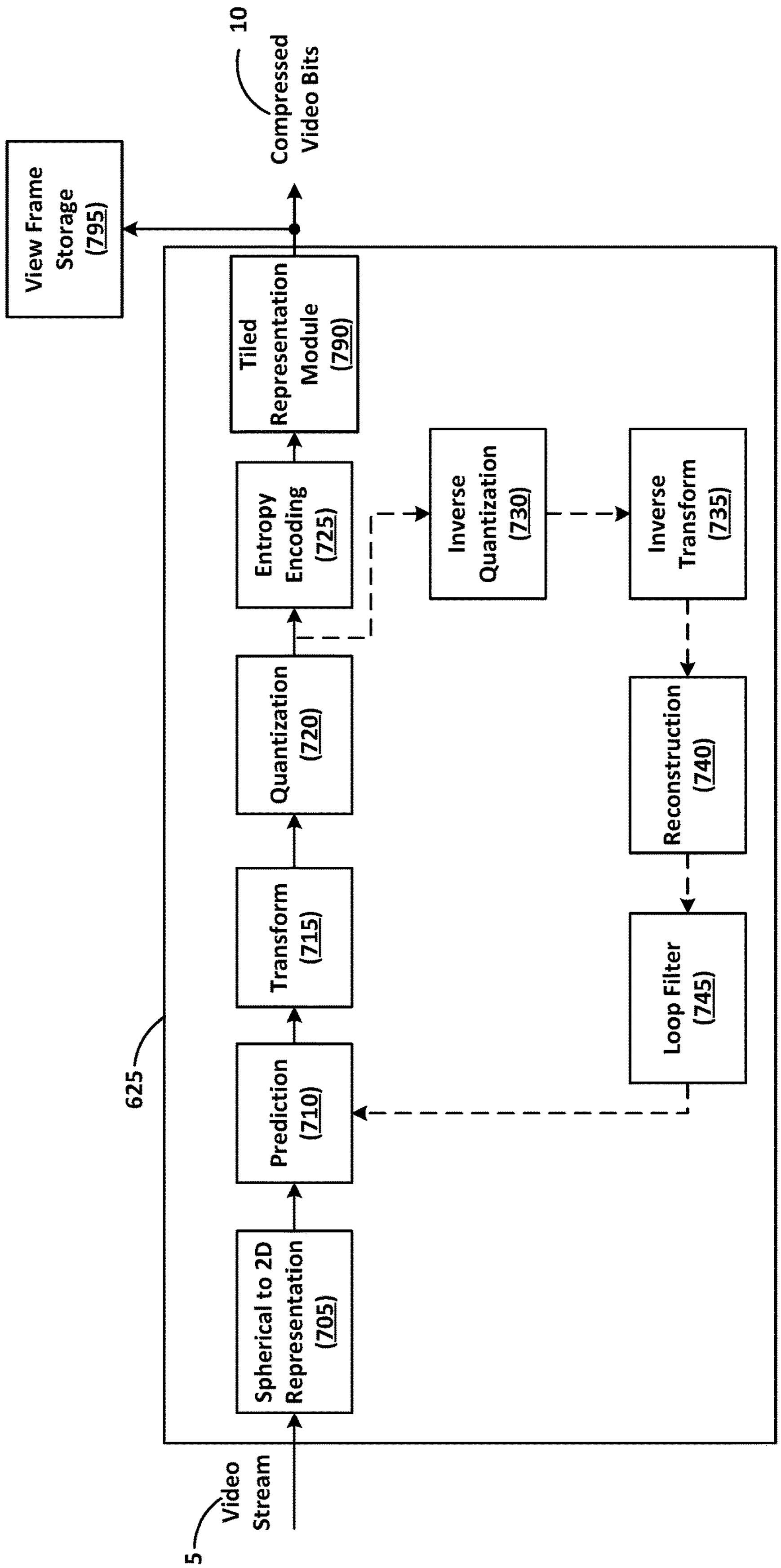
FIG. 7A illustrates a flow diagram for a video encoder system according to at least one example embodiment.
Figure 7B:
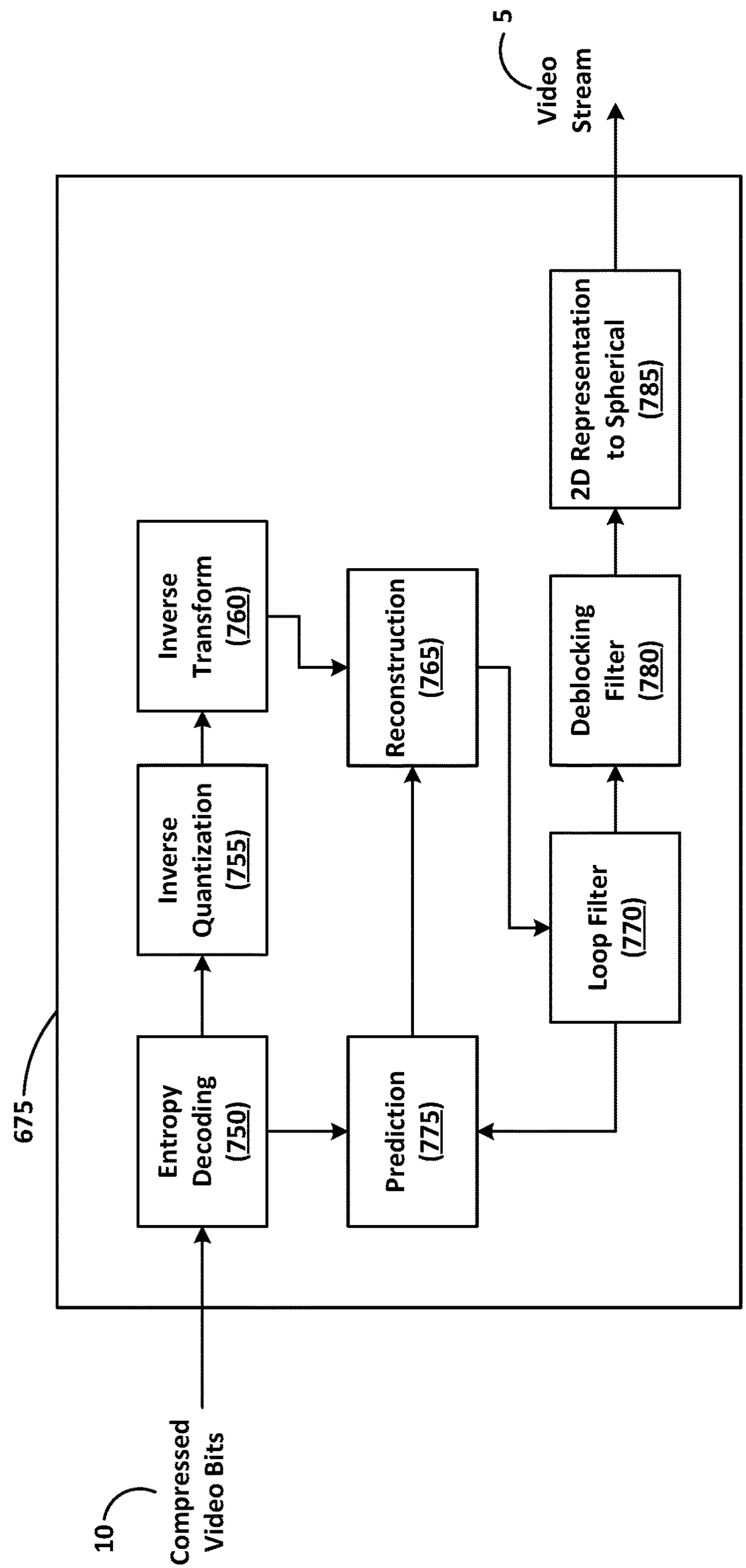
FIG. 7B illustrates a flow diagram for a video decoder system according to at least one example embodiment.

FIGS. 7A and 7B illustrate a flow diagram for the video encoder 625 shown in FIG. 6A and the video decoder 675 shown in FIG. 6B, respectively, according to at least one example embodiment. The video encoder 625 (described above) includes a spherical to 2D representation block 705, a prediction block 710, a transform block 715, a quantization block 720, an entropy encoding block 725, an inverse quantization block 730, an inverse transform block 735, a reconstruction block 740, and a loop filter block 745. Other structural variations of video encoder 625 can be used to encode input video stream 5. As shown in FIG. 7A, dashed lines represent a reconstruction path amongst the several blocks and solid lines represent a forward path amongst the several blocks.

Each of the aforementioned blocks may be executed as software code stored in a memory (e.g., at least one memory 610) associated with a video encoder system (e.g., as shown in FIG. 6A) and executed by at least one processor (e.g., at least one processor 605) associated with the video encoder system. However, alternative embodiments are contemplated such as a video encoder embodied as a special purpose processor. For example, each of the aforementioned blocks (alone and/or in combination) may be an application-specific integrated circuit, or ASIC. For example, the ASIC may be configured as the transform block 715 and/or the quantization block 720.

The spherical to 2D representation block 705 may be configured to map a spherical frame or image to a 2D representation of the spherical frame or image. For example, FIG. 2A illustrates the sphere 200 (e.g., as a frame or an image). The sphere 200 can be projected onto the surface of another shape (e.g., square, rectangle, cylinder and/or cube). Mapping a spherical frame or image to a 2D representation of the spherical frame or image is described with regard to FIG. 2B.

The prediction block 710 may be configured to utilize video frame coherence (e.g., pixels that have not changed as compared to previously encoded pixels). Prediction may include two types. For example, prediction may include intra-frame prediction and inter-frame prediction. Intra-frame prediction relates to predicting the pixel values in a block of a picture relative to reference samples in neighboring, previously coded blocks of the same picture. In intra-frame prediction, a sample is predicted from reconstructed pixels within the same frame for the purpose of reducing the residual error that is coded by the transform (e.g., entropy encoding block 725) and entropy coding (e.g., entropy encoding block 725) part of a predictive transform codec. Inter-frame prediction relates to predicting the pixel values in a block of a picture relative to data of a previously coded picture.

The transform block 715 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The transform block 715 may be configured to transform the residual (from the prediction block 710) into transform coefficients in, for example, the frequency domain. Typically, transforms include the Karhunen-Loève Transform (KLT), the Discrete Cosine Transform (DCT), the Singular Value Decomposition Transform (SVD) and the asymmetric discrete sine transform (ADST).

The quantization block 720 may be configured to reduce the data in each transformation coefficient. Quantization may involve mapping values within a relatively large range to values in a relatively small range, thus reducing the amount of data needed to represent the quantized transform coefficients. The quantization block 720 may convert the transform coefficients into discrete quantum values, which are referred to as quantized transform coefficients or quantization levels. For example, the quantization block 720 may be configured to add zeros to the data associated with a transformation coefficient. For example, an encoding standard may define 128 quantization levels in a scalar quantization process.

The quantized transform coefficients are then entropy encoded by entropy encoding block 725. The entropy-encoded coefficients, together with the information required to decode the block, such as the type of prediction used, motion vectors and quantizer value, are then output as the compressed video bits 10. The compressed video bits 10 can be formatted using various techniques, such as run-length encoding (RLE) and zero-run coding.

The reconstruction path in FIG. 7A is present to ensure that both the video encoder 625 and the video decoder 675 (described below with regard to FIG. 7B) use the same reference frames to decode compressed video bits 10 (or compressed image bits). The reconstruction path performs functions that are similar to functions that take place during the decoding process that are discussed in more detail below, including inverse quantizing the quantized transform coefficients at the inverse quantization block 730 and inverse transforming the inverse quantized transform coefficients at the inverse transform block 735 in order to produce a derivative residual block (derivative residual). At the reconstruction block 740, the prediction block that was predicted at the prediction block 710 can be added to the derivative residual to create a reconstructed block. A loop filter 745 can then be applied to the reconstructed block to reduce distortion such as blocking artifacts.

The video encoder 625 described above with regard to FIG. 7A includes the blocks shown. However, example embodiments are not limited thereto. Additional blocks may be added based on the different video encoding configurations and/or techniques used. Further, each of the blocks shown in the video encoder 625 described above with regard to FIG. 7A may be optional blocks based on the different video encoding configurations and/or techniques used.

FIG. 7B is a schematic block diagram of a decoder 675 configured to decode compressed video bits 10 (or compressed image bits). Decoder 675, similar to the reconstruction path of the encoder 625 discussed previously, includes an entropy decoding block 750, an inverse quantization block 755, an inverse transform block 760, a reconstruction block 765, a loop filter block 770, a prediction block 775, a deblocking filter block 780 and a 2D representation to spherical block 785.

The data elements within the compressed video bits 10 can be decoded by entropy decoding block 750 (using, for example, Context Adaptive Binary Arithmetic Decoding) to produce a set of quantized transform coefficients. Inverse quantization block 755 dequantizes the quantized transform coefficients, and inverse transform block 760 inverse transforms (using ADST) the dequantized transform coefficients to produce a derivative residual that can be identical to that created by the reconstruction stage in the encoder 625.

Using header information decoded from the compressed video bits 10, decoder 675 can use prediction block 775 to create the same prediction block as was created in encoder 675. The prediction block can be added to the derivative residual to create a reconstructed block by the reconstruction block 765. The loop filter block 770 can be applied to the reconstructed block to reduce blocking artifacts. Deblocking filter block 780 can be applied to the reconstructed block to reduce blocking distortion, and the result is output as video stream 5.

The 2D representation to spherical block 785 may be configured to map a 2D representation of a spherical frame or image to a spherical frame or image. For example, FIG. 2A illustrates a sphere 200 (e.g., as a frame or an image). The sphere 200 can be projected onto a 2D surface (e.g., a square or a rectangle). The mapping of the 2D representation of a spherical frame or image to the spherical frame or image can be the inverse of the previous mapping.

The video decoder 675 described above with regard to FIG. 7B includes the blocks shown. However, example embodiments are not limited thereto. Additional blocks may be added based on the different video encoding configurations and/or techniques used. Further, each of the blocks shown in the video decoder 575 described above with regard to FIG. 7B may be optional blocks based on the different video encoding configurations and/or techniques used.

The encoder 625 and the decoder may be configured to encode spherical video and/or images and to decode spherical video and/or images, respectively. A spherical image is an image that includes a plurality of pixels spherically organized. In other words, a spherical image is an image that is continuous in all directions. Accordingly, a viewer of a spherical image can reposition or reorient (e.g., move her head or eyes) in any direction (e.g., up, down, left, right, or any combination thereof) and continuously see a portion of the image.

Figure 8:
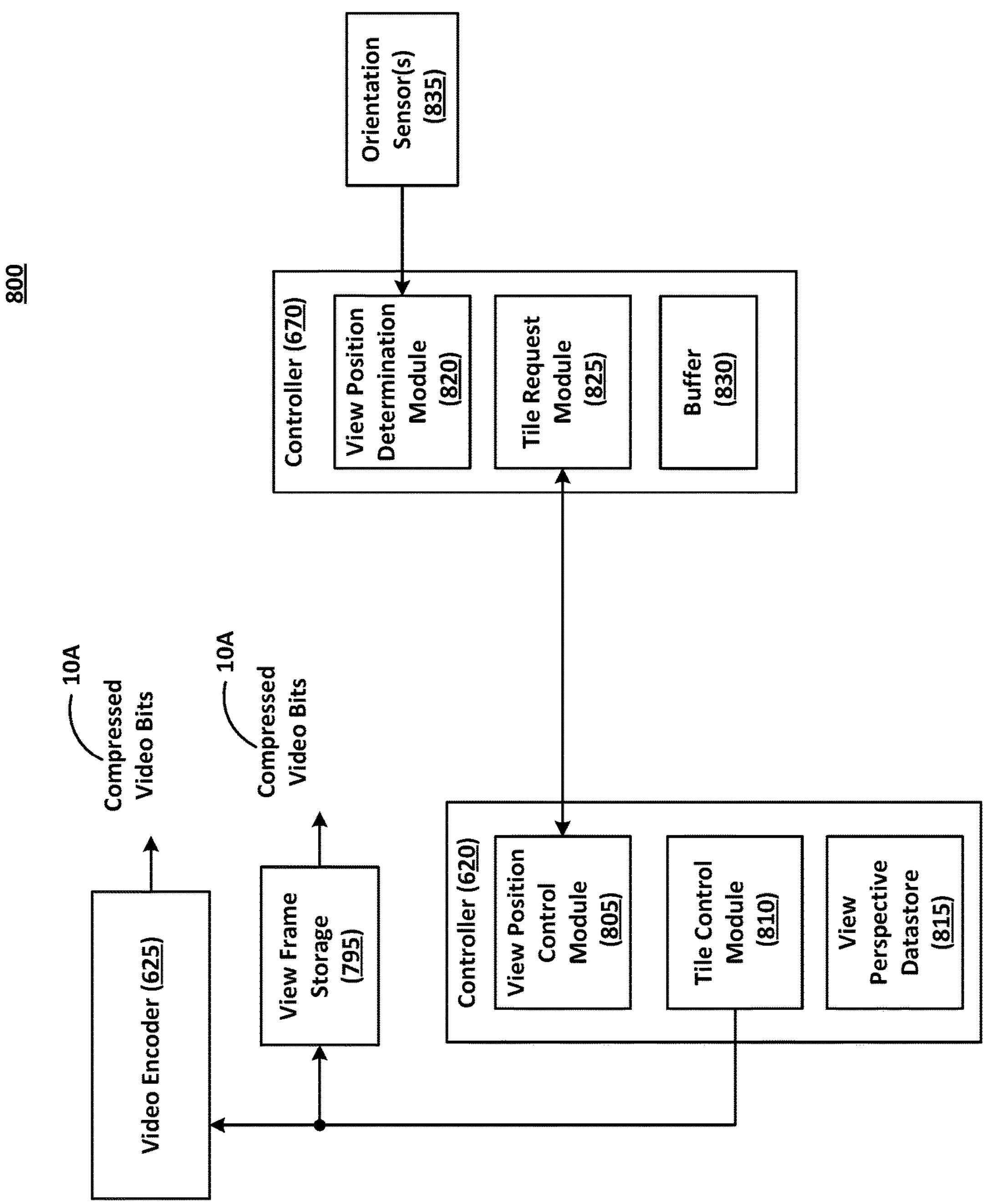
FIG. 8 illustrates a system according to at least one example embodiment.

FIG. 8 illustrates a system 800 according to at least one example embodiment. As shown in FIG. 8, the system 800 includes the controller 620, the controller 670, the video encoder 625, the view frame storage 795 and an orientation sensor(s) 835. The controller 620 further includes a view position control module 805, a tile control module 810 and a view perspective datastore 815. The controller 670 further includes a view position determination module 820, a tile request module 825 and a buffer 830.

According to an example implementation, the orientation sensor 835 detects an orientation (or change in orientation) of a viewer's head (and/or eyes), the view position determination module 820 determines a view, perspective or view perspective based on the detected orientation and the tile request module 825 communicates the view, perspective or view perspective as part of a request for a tile or a plurality of tiles (in addition to the spherical video). According to another example implementation, the orientation sensor 835 detects an orientation (or change in orientation) based on an image panning orientation as rendered on a HMD or a display. For example, a user of the HMD may change a depth of focus. In other words, the user of the HMD may change her focus to an object that is close from an object that was further away (or vice versa) with or without a change in orientation. For example, a user may use a mouse, a trackpad or a gesture (e.g., on a touch sensitive display) to select, move, drag, expand and/or the like a portion of the spherical video or image as rendered on the display.

The request for the tile may be communicated together with a request for a frame of the spherical video. The request for the tile may be communicated together separate from a request for a frame of the spherical video. For example, the request for the tile may be in response to a changed view, perspective or view perspective resulting in a need to replace previously requested and/or queued tiles.

The view position control module 805 receives and processes the request for the tile. For example, the view position control module 805 can determine a frame and a position of the tile or plurality of tiles in the frame based on the view. Then the view position control module 805 can instruct the tile control module 810 to select the tile or plurality of tiles. Selecting the tile or plurality of tiles can include passing a parameter to the video encoder 625. The parameter can be used by the video encoder 625 during the encoding of the spherical video and/or tile. Alternatively, selecting the tile or plurality of tiles can include selecting the tile or plural of tiles from the view frame storage 795.

Accordingly, the tile control module 810 may be configured to select a tile (or plurality of tiles) based a view or perspective or view perspective of a user watching the spherical video. The tile may be a plurality of pixels selected based on the view. The plurality of pixels may be a block, plurality of blocks or macro-block that can include a portion of the spherical image that can be seen by the user. The portion of the spherical image may have a length and width. The portion of the spherical image may be two dimensional or substantially two dimensional. The tile can have a variable size (e.g., how much of the sphere the tile covers). For example, the size of the tile can be encoded and streamed based on, for example, how wide the viewer's field of view is and/or how quickly the user is rotating their head. For example, if the viewer is continually looking around, then larger, lower quality tiles may be selected. However, if the viewer is focusing on one perspective, smaller more detailed tiles may be selected.

Accordingly, the orientation sensor 835 can be configured to detect an orientation (or change in orientation) of a viewer's eyes (or head). For example, the orientation sensor 835 can include an accelerometer in order to detect movement and a gyroscope in order to detect orientation. Alternatively, or in addition to, the orientation sensor 835 can include a camera or infrared sensor focused on the eyes or head of the viewer in order to determine an orientation of the eyes or head of the viewer. Alternatively, or in addition to, the orientation sensor 835 can determine a portion of the spherical video or image as rendered on the display in order to detect an orientation of the spherical video or image. The orientation sensor 835 can be configured to communicate orientation and change in orientation information to the view position determination module 820.

The view position determination module 820 can be configured to determine a view or perspective view (e.g., a portion of a spherical video that a viewer is currently looking at) in relation to the spherical video. The view, perspective or view perspective can be determined as a position, point or focal point on the spherical video. For example, the view could be a latitude and longitude position on the spherical video. The view, perspective or view perspective can be determined as a side of a cube based on the spherical video. The view (e.g., latitude and longitude position or side) can be communicated to the view position control module 805 using, for example, a Hypertext Transfer Protocol (HTTP).

The view position control module 805 may be configured to determine a view position (e.g., frame and position within the frame) of a tile or plurality of tiles within the spherical video. For example, the view position control module 805 can select a rectangle centered on the view position, point or focal point (e.g., latitude and longitude position or side). The tile control module 810 can be configured to select the rectangle as a tile or plurality of tiles. The tile control module 810 can be configured to instruct (e.g., via a parameter or configuration setting) the video encoder 625 to encode the selected tile or plurality of tiles and/or the tile control module 810 can be configured to select the tile or plurality of tiles from the view frame storage 795.

As will be appreciated, the system 600 and 650 illustrated in FIGS. 6A and 6B and/or system 800 illustrated in FIG. 8 may be implemented as an element of and/or an extension of the generic computer device 900 and/or the generic mobile computer device 950 described below with regard to FIG. 9. Alternatively, or in addition to, the system 600 and 650 illustrated in FIGS. 6A and 6B and/or system 800 illustrated in FIG. 8 may be implemented in a separate system from the generic computer device 900 and/or the generic mobile computer device 950 having some or all of the features described below with regard to the generic computer device 900 and/or the generic mobile computer device 950.

Figure 9:
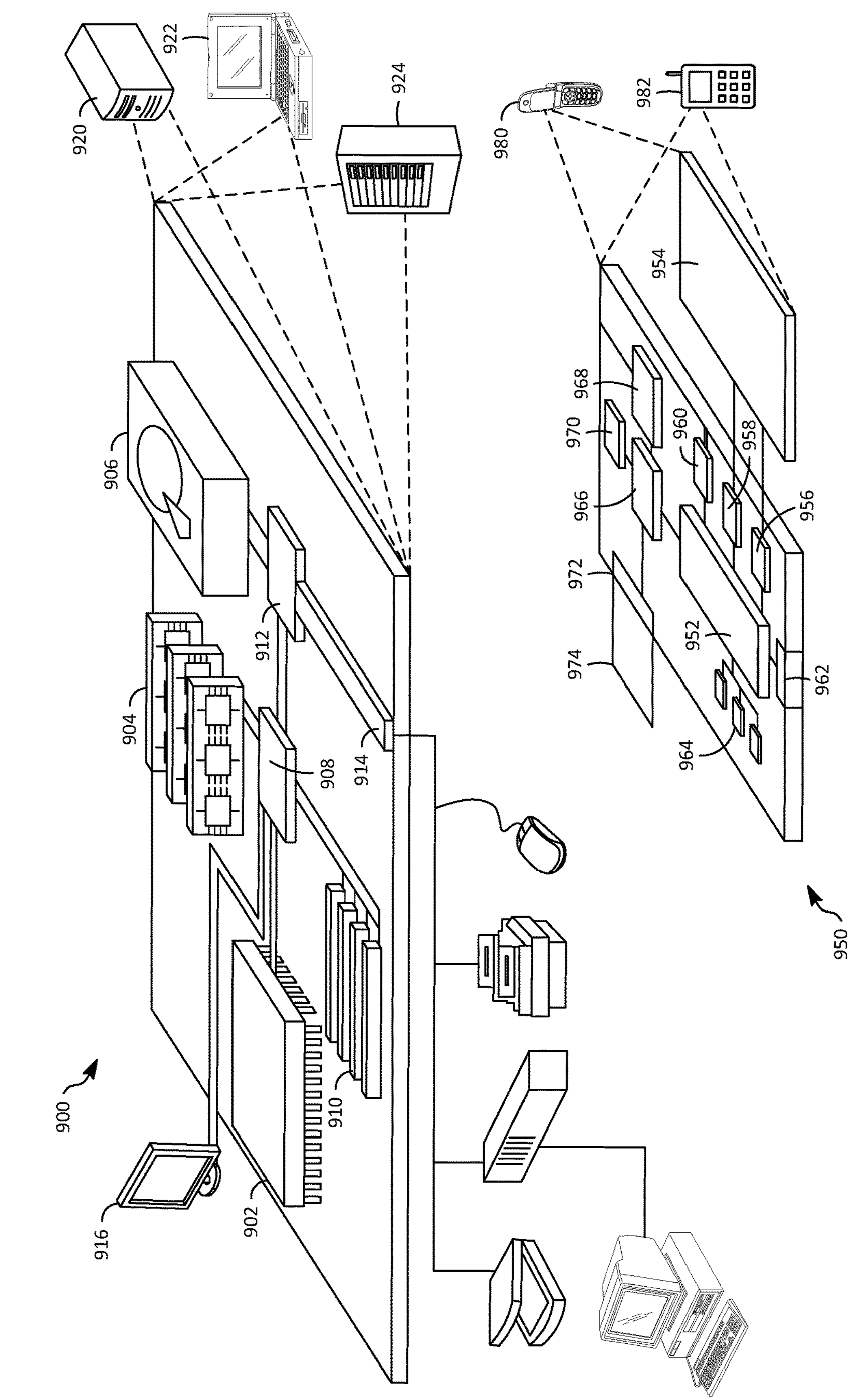
FIG. 9 is a schematic block diagram of a computer device and a mobile computer device that can be used to implement the techniques described herein.

FIG. 9 is a schematic block diagram of a computer device and a mobile computer device that can be used to implement the techniques described herein. FIG. 9 is an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing partitions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Figure 10A:
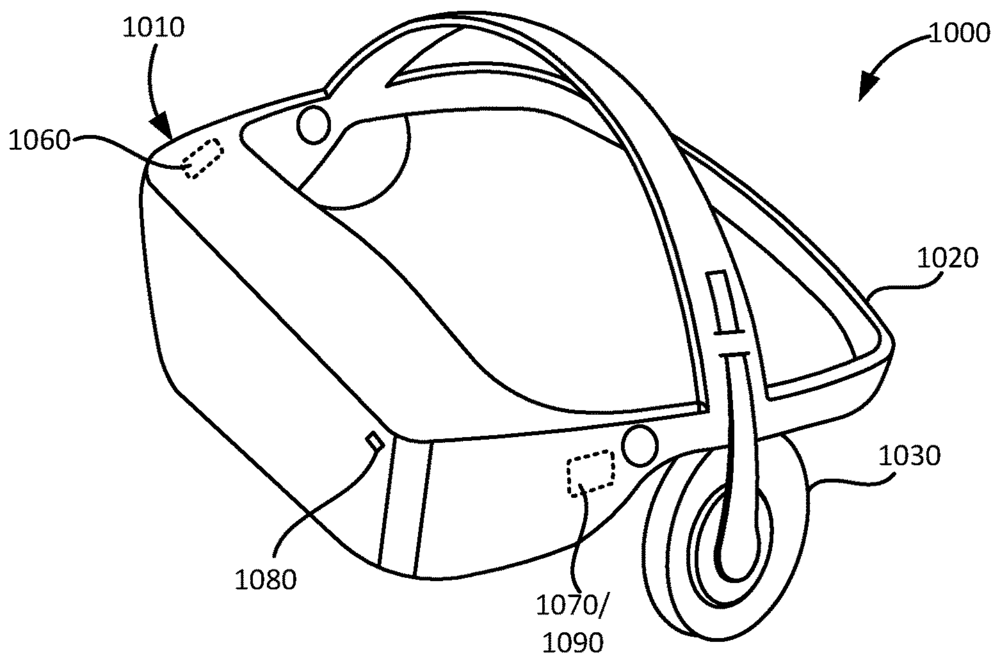
FIGS. 10A and 10B are perspective views of a head mounted display device, in accordance with implementations described herein.
Figure 10B:
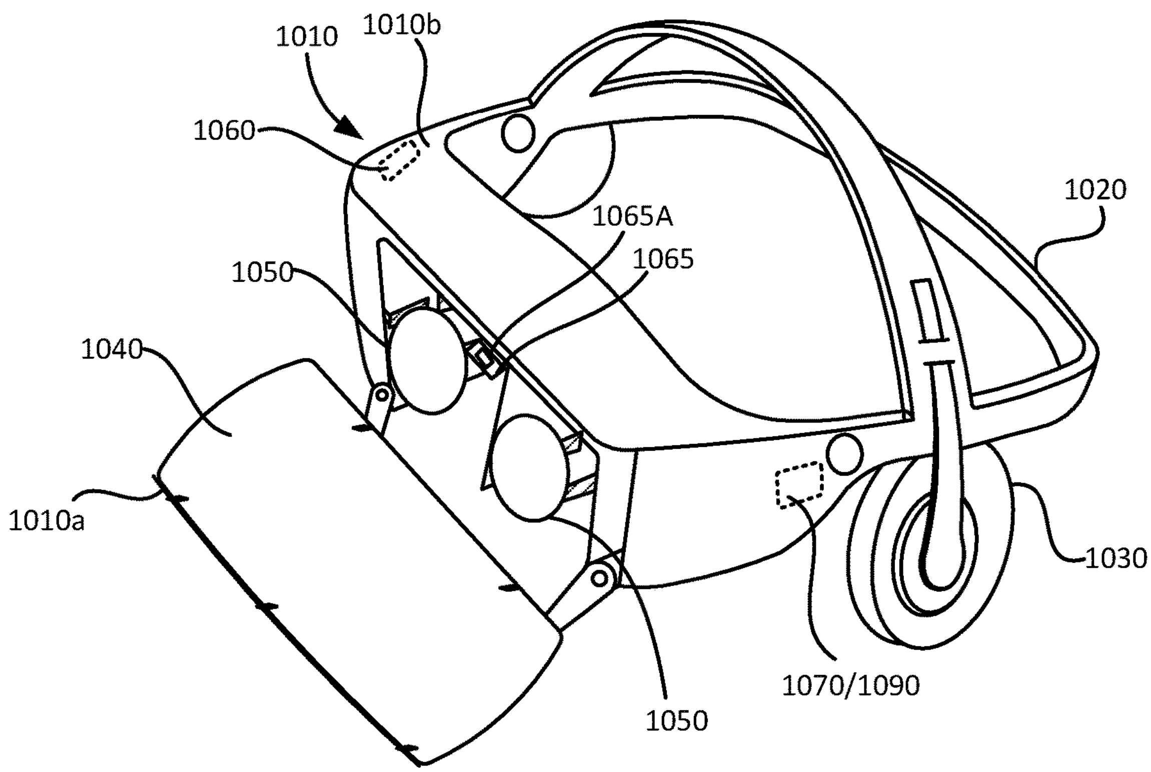

FIGS. 10A and 10B are perspective views of an example HMD, such as, for example, the HMD 1000 worn by a user, to generate an immersive virtual reality environment. The HMD 1000 may include a housing 1010 coupled, for example, rotatably coupled and/or removably attachable, to a frame 1020. An audio output device 1030 including, for example, speakers mounted in headphones, may also be coupled to the frame 1020. In FIG. 10B, a front face 1010*a* of the housing 1010 is rotated away from a base portion 1010*b* of the housing 1010 so that some of the components received in the housing 1010 are visible. A display 1040 may be mounted on the front face 1010*a* of the housing 1010. Lenses 1050 may be mounted in the housing 1010, between the user's eyes and the display 1040 when the front face 1010*a* is in the closed position against the base portion 1010*b* of the housing 1010. A position of the lenses 1050 may be may be aligned with respective optical axes of the user's eyes to provide a relatively wide field of view and relatively short focal length. In some embodiments, the HMD 1000 may include a sensing system 1060 including various sensors and a control system 1070 including a processor 1090 and various control system devices to facilitate operation of the HMD 1000.

In some implementations, the HMD 1000 may include a camera 1080 to capture still and moving images of the real world environment outside of the HMD 1000. In some implementations the images captured by the camera 1080 may be displayed to the user on the display 1040 in a pass through mode, allowing the user to view images from the real world environment without removing the HMD 1000 or otherwise changing the configuration of the HMD 1000 to move the housing 1010 out of the line of sight of the user.

In some implementations, the HMD 1000 may include an optical tracking device 1065 including, for example, one or more images sensors 1065A, to detect and track user eye movement and activity such as, for example, optical position (for example, gaze), optical activity (for example, swipes), optical gestures (such as, for example, blinks) and the like. In some implementations, the HMD 1000 may be configured so that the optical activity detected by the optical tracing device 1065 is processed as a user input to be translated into a corresponding interaction in the virtual environment generated by the HMD 1000.

In an example implementation, a user wearing an HMD 1000 can be interacting in the immersive virtual environment generated by the HMD 1000. In some implementations, a six degree of freedom (6DOF) position and orientation of the HMD 1000 may be tracked based on various sensors included in the HMD 1000, such as, for example, an inertial measurement unit including, for example, an accelerometer, a gyroscope, a magnetometer, and the like as in a gyroscope, or a smartphone adapted in this manner. In some implementations, a 6DOF position may be tracked based on a position of the HMD 1000 as detected by other sensors in the system, such as, for example image sensors included on the HMD 1000, together with orientation sensors. That is, a manipulation of HMD 1000, such as, for example, a physical movement may be translated into a corresponding interaction, or movement, in the virtual environment.

For example, the HMD 1000 may include a gyroscope that generates a signal indicating angular movement of the HMD 1000 that can be translated into directional movement in the virtual environment. In some implementations, the HMD 1000 may also include an accelerometer that generates a signal indicating acceleration of the HMD 1000, for example, acceleration in a direction corresponding to the directional signal generated by the gyroscope. In some implementations, the HMD 1000 may also include a magnetometer that generates a signal indicating relative position of the HMD 1000 in the real world environment based on the strength and/or direction of a detected magnetic field. The detected three dimensional position of the HMD 1000 in the real world environment, together with orientation information related to the HMD 1000 provided by the gyroscope and/or accelerometer and/or magnetometer, may provide for 6DOF tracking of the HMD 1000, so that user manipulation of the HMD 1000 may be translated into a targeted, or intended interaction in the virtual environment and/or directed to a selected virtual object in the virtual environment.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A streaming server comprising:

a processor; and a memory, the memory including code as instructions that cause the processor to:

determine whether bandwidth is available to stream a video at a target serving frame rate;

upon determining the bandwidth is available, stream the video at the target serving frame rate;

upon determining the bandwidth is not available:

determine whether an orientation velocity prediction can predict a next frame position;

upon determining the orientation velocity prediction can predict a next frame position:

serve a frame of the video with a first buffer area associated with a view perspective, and stream the frame of the video at a first frame rate;

upon determining the orientation velocity prediction can not predict a next frame position:

serve the frame of the video with a second buffer area, the second buffer area being larger than the first buffer area, and stream the frame of the video at a second frame rate.

2. The streaming server of claim 1, wherein the video is a spherical video.

3. The streaming server of claim 1, wherein the determining of whether bandwidth is available includes:

time stamping data packets associated with the video, and determining how long the video packets take to reach a destination.

4. The streaming server of claim 1, wherein the serving of the frame of the video with the first buffer area includes:

determining a number of pixels to stream based on the view perspective, and determining a number of additional pixels to stream based on the view perspective and a size of the first buffer area.

5. The streaming server of claim 1, wherein the serving of the frame of the video with the second buffer area includes:

determining a number of pixels to stream based on the view perspective, and determining a number of additional pixels to stream based on the view perspective and a size of the second buffer area.

6. The streaming server of claim 1, wherein the streaming of the frame of the video at the first frame rate includes increasing the first frame rate to a target frame rate.

7. The streaming server of claim 1, wherein the streaming of the frame of the video at the second frame rate includes decreasing the second frame rate to a frame rate greater than or equal to zero frames per second (fps).

8. The streaming server of claim 1, wherein streaming audio associated with the video is modified based on a corresponding frame rate.

9. The streaming server of claim 1, wherein the code as instructions further cause the processor to:

receive an indication that a view perspective has changed from a first position to a second position in a streaming video;

receive an indication of a rate of change associated with the change from the first position to the second position;

stream the video using a lower bandwidth having a reduced playback frame rate of the video based on the rate of change.

10. The streaming server of claim 1, wherein the code as instructions further cause the processor to:

receive an indication of a rate of change associated with a change in a view perspective;

determine whether the rate of change is below a threshold, and in response to determining the rate of change is below the threshold, stopping the streaming of the video.

11. A method for streaming video comprising:

determining whether bandwidth is available to stream a video at a target serving frame rate;

in response to determining the bandwidth is available, stream the video at the target serving frame rate;

in response to determining the bandwidth is not available:

determining whether an orientation velocity prediction can predict a next frame position;

in response to determining the orientation velocity prediction can predict a next frame position:

serve a frame of the video with a first buffer area associated with a view perspective, and stream the frame of the video at a first frame rate;

in response to determining the orientation velocity prediction can not predict a next frame position:

serve the frame of the video with a second buffer area, the second buffer area being larger than the first buffer area, and stream the frame of the video at a second frame rate.

12. The method of claim 11, wherein the video is a spherical video.

13. The method of claim 11, wherein the determining of whether bandwidth is available includes:

time stamping data packets associated with the video, and determining how long the video packets take to reach a destination.

14. The method of claim 11, wherein the serving of the frame of the video with the first buffer area includes:

determining a number of pixels to stream based on the view perspective, and determining a number of additional pixels to stream based on the view perspective and a size of the first buffer area.

15. The method of claim 11, wherein the serving of the frame of the video with the second buffer area includes:

determining a number of pixels to stream based on the view perspective, and determining a number of additional pixels to stream based on the view perspective and a size of the second buffer area.

16. The method of claim 11, wherein the streaming of the frame of the video at the first frame rate includes increasing the first frame rate to a target frame rate.

17. The method of claim 11, wherein the streaming of the frame of the video at the second frame rate includes decreasing the second frame rate to a frame rate greater than or equal to zero frames per second (fps).

18. The method of claim 11, wherein streaming audio associated with the video is modified based on a corresponding frame rate.

19. The method of claim 11, further comprising:

receiving an indication that a view perspective has changed from a first position to a second position in a streaming video;

receiving an indication of a rate of change associated with the change from the first position to the second position;

streaming the video using a lower bandwidth having a reduced playback frame rate of the video based on the rate of change.

20. The method of claim 11, further comprising:

receiving an indication of a rate of change associated with a change in a view perspective;

determining whether the rate of change is below a threshold, and in response to determining the rate of change is below the threshold, stopping the streaming of the video.

* * * * *